(12) United States Patent
Voice et al.

(10) Patent No.: US 9,902,018 B2
(45) Date of Patent: Feb. 27, 2018

(54) MULTI-WIRE FEEDER METHOD AND SYSTEM FOR ALLOY SAMPLE FORMATION AND ADDITIVE MANUFACTURING

(75) Inventors: Wayne Eric Voice, West Bridgford (GB); David John Jarvis, Voorschoten (NL); Nicholas John Elsworth Adkins, Cheshire (GB)

(73) Assignee: EUROPEAN SPACE AGENCY, Paris (FR)

( * ) Notice: Subject to any disclaimer, the term of this patent is extended or adjusted under 35 U.S.C. 154(b) by 343 days.

(21) Appl. No.: 14/403,913

(22) PCT Filed: May 25, 2012

(86) PCT No.: PCT/EP2012/059895
§ 371 (c)(1),
(2), (4) Date: Nov. 25, 2014

(87) PCT Pub. No.: WO2013/174449
PCT Pub. Date: Nov. 28, 2013

(65) Prior Publication Data
US 2015/0165554 A1  Jun. 18, 2015

(51) Int. Cl.
| | |
|---|---|
| *B23K 9/00* | (2006.01) |
| *B23K 26/14* | (2014.01) |
| *B33Y 40/00* | (2015.01) |
| *B23K 26/34* | (2014.01) |
| *B23K 35/02* | (2006.01) |
| *C23C 4/08* | (2016.01) |
| *C23C 4/16* | (2016.01) |
| *B33Y 30/00* | (2015.01) |

(Continued)

(52) U.S. Cl.
CPC ........ *B23K 26/1464* (2013.01); *B23K 10/027* (2013.01); *B23K 15/0086* (2013.01); *B23K 26/1476* (2013.01); *B23K 26/34* (2013.01); *B23K 26/342* (2015.10); *B23K 35/0244* (2013.01); *B33Y 30/00* (2014.12); *B33Y 40/00* (2014.12); *C23C 4/08* (2013.01); *C23C 4/16* (2013.01); *B33Y 10/00* (2014.12)

(58) Field of Classification Search
CPC  B23K 26/1464; B23K 26/342; B23K 10/027; B23K 15/0086; B23K 26/1476; B23K 26/34; B23K 35/0244; C23C 4/08; C23C 4/16; B33Y 10/00; B33Y 30/00
USPC .................................................... 219/121.72
See application file for complete search history.

(56) References Cited

U.S. PATENT DOCUMENTS

| | | |
|---|---|---|
| 5,137,223 A | 8/1992 | Brandon et al. |
| 5,578,227 A | 11/1996 | Rabinovich |

(Continued)

FOREIGN PATENT DOCUMENTS

| | | |
|---|---|---|
| EP | 1825948 A2 | 8/2007 |
| WO | 2006133034 A1 | 12/2006 |
| WO | 2009039753 A1 | 4/2009 |

*Primary Examiner* — Arthur O Hall
*Assistant Examiner* — Adam J Rogers
(74) *Attorney, Agent, or Firm* — Avery N. Goldstein; Blue Filament Law, PLLC

(57) ABSTRACT

Systems and methods, comprising a directed heat source coupled to a multi-wire feed-head configured to feed one or more wires having diverse compositions into a heat affected region, are provided for the synthesis of alloy samples having defined compositions, combinatorial alloy sample series and libraries, and shaped alloy components.

10 Claims, 8 Drawing Sheets

(51) Int. Cl.
*B23K 10/02* (2006.01)
*B23K 15/00* (2006.01)
*B23K 26/342* (2014.01)
*B33Y 10/00* (2015.01)

(56) References Cited

U.S. PATENT DOCUMENTS

| | | | |
|---|---|---|---|
| 5,961,862 A | 10/1999 | Lewis et al. | |
| 6,127,651 A * | 10/2000 | Burgoon | B23K 9/1093 219/137 R |
| 6,143,378 A * | 11/2000 | Harwell | C23C 26/02 427/264 |
| 6,294,754 B1 | 9/2001 | Nagura et al. | |
| 6,365,867 B1 | 4/2002 | Hooper | |
| 8,901,453 B2 * | 12/2014 | Miyagi | B23K 26/147 219/121.63 |
| 9,481,931 B2 * | 11/2016 | Stempfer | B22F 3/1055 |
| 2005/0133486 A1 | 6/2005 | Baker et al. | |
| 2005/0173380 A1 * | 8/2005 | Carbone | B22F 3/1055 219/121.31 |
| 2006/0049153 A1 | 3/2006 | Cahoon et al. | |
| 2010/0089890 A1 | 4/2010 | Manning | |
| 2011/0297658 A1 * | 12/2011 | Peters | B23K 9/02 219/162 |
| 2013/0146566 A1 * | 6/2013 | Peters | B23K 9/04 219/61 |

* cited by examiner

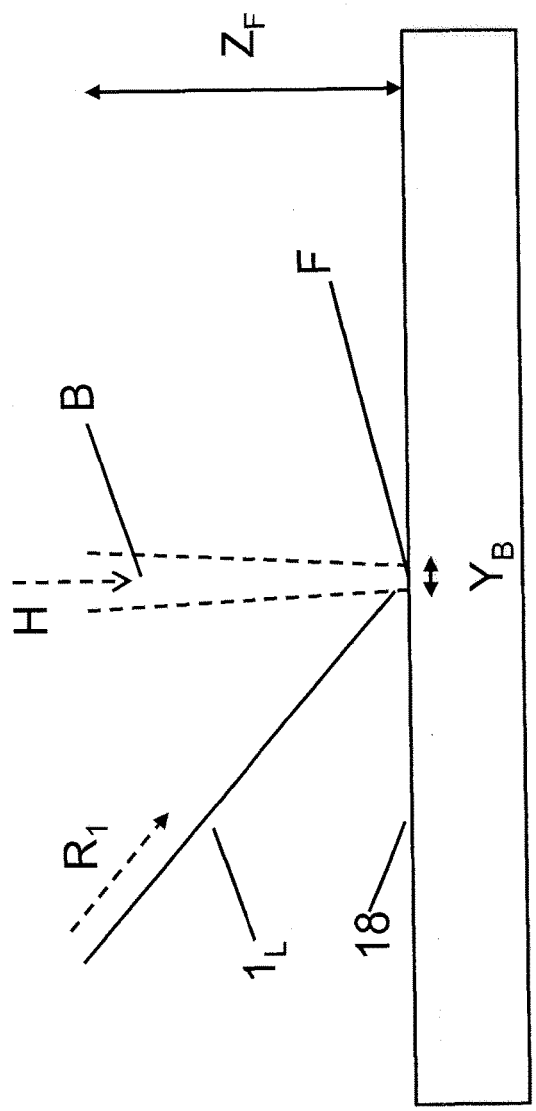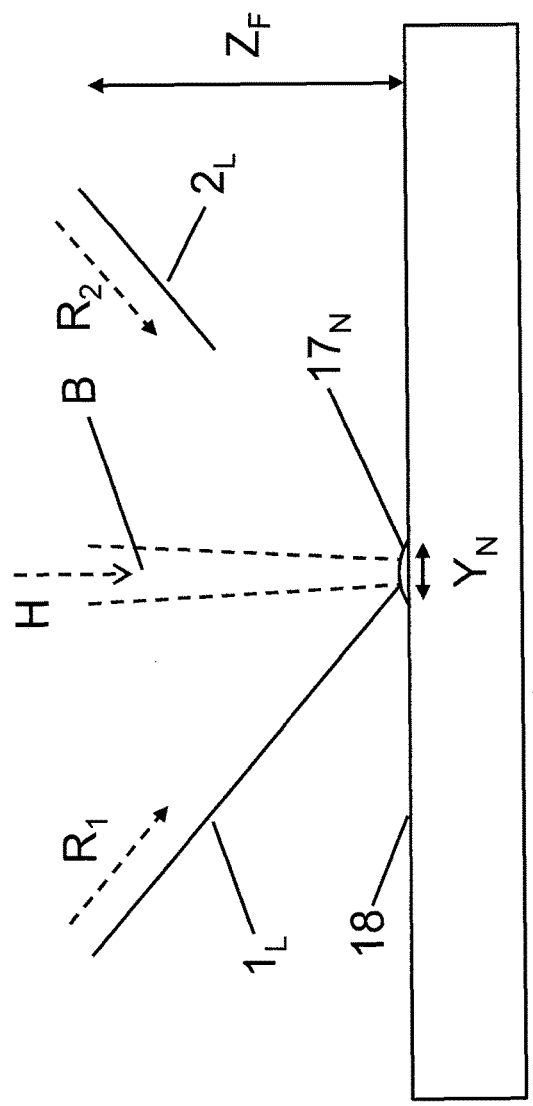

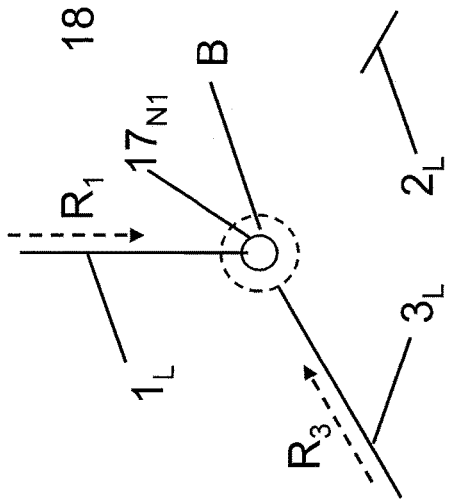
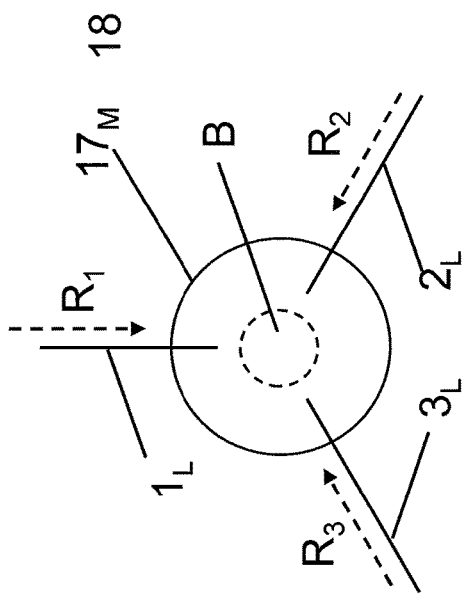
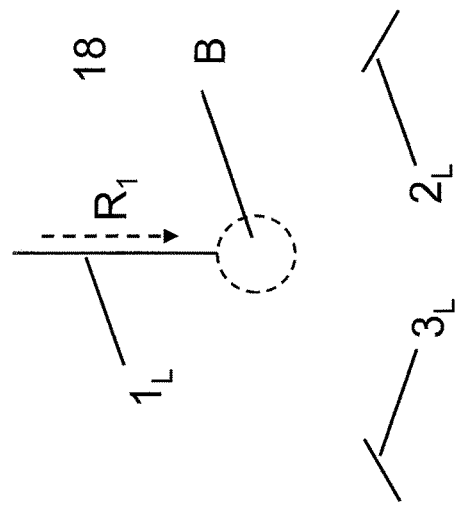
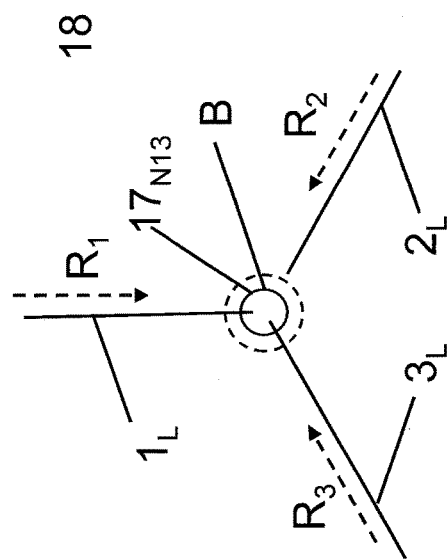

MULTI-WIRE FEEDER METHOD AND SYSTEM FOR ALLOY SAMPLE FORMATION AND ADDITIVE MANUFACTURING

TECHNICAL FIELD

The invention relates to the formation of alloy samples, to combinatorial alloy discovery using combinatorial sample series and libraries, and to additive manufacturing of shaped alloy components.

BACKGROUND

The combinatorial approach to materials development depends on being able to rapidly synthesize sample libraries spanning diverse ranges of compositions and processing conditions. The approach has seen widespread application in the pharmaceutical and other sectors, but has been applied only tentatively in alloy development, largely because of the difficulties of rapidly synthesizing, under clean conditions and at high temperatures, series or libraries of samples large and homogeneous enough to exhibit bulk-like alloy properties.

Separately, the high cost of shaped alloy components made using conventional metallurgical processes has spurred development of a range of additive-manufacturing technologies, in which components are formed by sequentially depositing controlled amounts of material on selected areas of a work-piece surface while a localized heat source is applied to those areas. In such additive manufacturing technologies, the localized heat source is typically a laser, a directed plasma arc or an electron beam, and the material is typically fed in the form of a powder stream or wire.

Additive manufacturing systems that combine a localized heat source with one or more powder streams have been developed. For example, U.S. Pat. No. 5,961,862 (University of California) discloses an integrated deposition head delivering two or more gas-assisted powder streams having the same composition towards the focal region of the laser. However, the difficulty of incorporating even a substantial fraction of the incident powder stream (or streams) directed towards a small heated region, such as a pool of molten material produced by a focused laser, renders powder-based systems inherently unsuitable for use in combinatorial alloy development, which requires precise and accurate control of sample composition, and also increases the cost of components made by powder-based additive manufacturing.

Unlike powder feeders, a suitably configured wire-feeder can deliver substantially all of a length of wire, comprising an element or alloy, into a small region of molten material. Various wire feeders, allowing accurate and precise control of feed rate, rapid starting and stopping of the feed, and accurate and precise positioning of the end of a single wire, have been developed, generally for use in welding. US Pub. App. No. 2010/0089890 (Manning) describes a hand-held wire-feeder with a positioning tube for the relatively fine wires, 0.13 to 0.32 mm diameter, used in laser welding of jewelry, and U.S. Pat. No. 5,137,223 (US Dept. of Energy), a machine-controlled wire feeder, comprising a torque motor that applies tension to the wire and a stepper motor that advances an elastic-coated drive wheel to deliver wire through a hypodermic needle into the less than 0.25 mm diameter melt pools typical in high density electron beam or laser welding. A laser welding system having a separate wire-feeder for introducing wire into the output of a laser head integrated with a powder feeder, allowing switching between laser and powder feed, has also be proposed. US Pub. App. No. 2006/0049153 (Honeywell Int'l, Ltd.).

In order to improve process controllability and access to non-planar work-pieces, feed-heads having laser optical systems adapted to accommodate a single, axially-fed wire have been developed. U.S. Pat. No. 6,294,754 (Mitsubishi Heavy Indus., Ltd.); WO Pub. App. No. 2009/039753 (Suzhou Univ.). A plasma-arc feed-head comprising a single, axially-fed, wire has also been developed. U.S. Pat. No. 6,365,867 (Sandia Corp.). Such single-wire feed-heads are not capable of the rapid synthesis of combinatorial alloy sample series or libraries from multiple wires having diverse compositions.

U.S. Pat. No. 5,578,227 (Rabinovitch) discloses a rapid prototyping system comprising a wire feeder and delivery tube configured to pivot around the optic axis of a laser head, FIGS. 1; 5:55-6:6 & 6:9-14. U.S. Pat. No. 5,578,227, and proposes that composite prototype articles, comprising, for example, layers of stainless steel and an organic material, might be produced by alternating two wire feeders delivering two different materials. 7:3-9. U.S. Pat. No. 5,578,227 does not disclose combining the output of two wire feeders in a single molten region, either sequentially or simultaneously.

The present invention overcomes the above and other limitations of the prior art by employing an integrated multi-wire feed-head to form alloy samples having defined compositions, suitable for combinatorial alloy discovery and additive manufacturing applications.

SUMMARY OF THE INVENTION

In one embodiment, a method is disclosed for producing an alloy sample, comprising the steps of: furnishing a directional heat source and wire feed-head; disposing a work-piece surface a fixed distance from the wire feed-head, wherein the feed-head and work-piece are configured to allow the feed-head to deliver heat from the directional heat source into a heat-affected region comprising at least a portion of the work-piece surface, and wherein the feed-head is further configured to feed the ends of one or more of a multiplicity of wires having diverse compositions into the heat-affected region; the method further comprising the steps of: delivering heat and feeding selected lengths of at least two wires having diverse compositions into the heat-affected region to form, on the portion of the work-piece surface, a substantially homogeneous molten alloy portion having a composition defined by the cross sectional areas and relative proportions of the selected lengths of the at least two wires; and cooling the molten alloy portion to form a solid alloy portion having the same defined composition as the molten alloy portion.

In other embodiments, the selected lengths of the at least two wires are fed simultaneously into the heat affected region, the selected lengths are regulated by regulating the feed rates of the at least two wires over a time interval, and the feed rates of the at least two wires are fixed over the time interval and the relative proportions of the selected lengths are regulated by regulating the relative proportions of the feed rates of the at least two wires.

In yet another embodiment, immediately preceding the step of delivering heat and feeding selected lengths of the at least two wires, a length of one of the at least two wires is fed and heat is delivered into the heat affected region to form a molten nucleus on the portion of the work-piece surface, wherein the length is a negligible fraction of the selected length of that wire.

In another embodiment, following the step of delivering heat into the heat-affected region while feeding and melting selected lengths of the at least two wires, the steps are implemented of delivering heat and feeding second selected lengths of the at least two wires having diverse compositions into the molten alloy portion over a second time interval while maintaining the defined composition of the molten alloy portion essentially constant during the second time interval; and maintaining an essentially fixed distance between the feed-head and the molten alloy portion during the second interval by increasing the distance between the feed-head and the original work-piece surface to compensate for formation of a solid alloy portion disposed between the molten alloy portion and the original work-piece surface.

In yet another embodiment, the second selected lengths have the same relative proportions as the selected lengths, the feed rates of the at least two wires are fixed over the second time interval and the relative proportions of the second selected lengths are regulated by regulating the relative proportions of the feed rates of the at least two wires, In yet other embodiments, the feed rates of the at least two wires are unchanged between the first and second time intervals, the second time interval is at least five times as long as the first time interval and the molten alloy portion maintains essentially the same diameter throughout the second interval.

In other embodiments, the head is further configured to direct one or more powder streams towards the heat-affected region, one or more powder streams are directed towards the heat-affected region and material comprising the one or more powder streams incorporated into the molten alloy portion.

In yet other embodiments, the molten or solid alloy portions are exposed to a reactive gas and at least a fraction of the reactive gas incorporated into the molten or solid alloy portions.

In other embodiments, the directional heat source is a laser, an electron beam or a plasma arc.

In yet further embodiments, additional heat is supplied to or removed from the work-piece while feeding the at least two wires, one or more of the selected lengths of at least two wires are preheated, heat is delivered from a second directional heat source to the molten alloy portion.

In other embodiments, the molten alloy portion is cooled to form a substantially homogeneous solid alloy portion or heat is delivered to the solid alloy portion to form a substantially homogeneous solid alloy portion before it is cooled.

In further embodiments, a shaped component is formed by applying controlled relative motion between feed-head and work-piece while directing heat and feeding the at least two wires to form successive solid alloy layers on selected regions of the work-piece surface, wherein the selective layers comprise a shaped alloy component having a defined composition, and the defined composition of at least a portion of the successive solid alloy layers are changed, wherein the selected layers comprise a shaped alloy component comprising regions of diverse defined alloy compositions.

In another embodiment, a combinatorial alloy sample series or library is created by applying controlled relative motion between feed-head and work-piece and forming, at different locations on the original work-piece surface, a multiplicity of alloy samples have diverse defined compositions and/or diverse thermal histories.

In another embodiment, a multi-wire feed-head is disclosed suitable for use in any of the above methods, comprising: an upper section comprising an entrance opening for receiving heat output from a directional heat source; a lower section comprising an upward facing surface and a downward facing surface; an elongated heat delivery channel traversing the upper and lower head sections running between the upper section opening and an exit disposed in the downward-facing surface of the lower section; and, a multiplicity of elongated wire channels traversing the lower head section, each channel running between one of the multiplicity of entrances disposed on the upward facing surface and one of the multiplicity of exits disposed on the downward-facing surface; wherein at least a two of the multiplicity of entrances are configured to receive each of at least two wire feeds from each of at least a two wire feeders and the corresponding two wire exits are configured to deliver wire towards a common focus.

In other embodiments of the feed-head, the heat delivery channel is aligned along a common longitudinal axis of the upper and lower head sections, and the longitudinal axes of the multiplicity of elongated wire channels are inclined at equal angles to the head longitudinal axis and converge on the common focus disposed on the head longitudinal axis below the downward-facing surface.

In yet other embodiments, the longitudinal axes of the multiplicity of channels are inclined at around 50 degrees to the longitudinal axis and distributed symmetrically around the longitudinal head axis, the multiplicity of channels have essentially cylindrical portions with internal diameters between about 1.5 and 3.0 mm and lengths between about 15 and 50 mm, the multiplicity of wire channels comprises twelve or more channels, one or more of the multiplicity of wire channels further comprises a constriction at the channel exit, the multiplicity of wire channels comprises wire channels of the same length and internal diameter, liner tubes traverse at least a portion of one or more of the wire channels and extend beyond the downward-facing surface, In further embodiments, the downward-facing surface is essentially flat and disposed perpendicular to the head longitudinal axis, concave and disposed co-axially with respect to the longitudinal head axis to reflect heat radiation towards the common focus, and substantially hemispherical, again disposed co-axially with respect to the longitudinal head axis to reflect heat radiation towards the common focus.

In other embodiments, feed head further comprises a second upward-facing surface and one or more elongated powder feed channels, each running between an entrance on the second upward facing surface and an exit on downward-facing surface, and the longitudinal axes of the one or more powder channels are inclined at around 20 degrees to the longitudinal axis and have essentially cylindrical portions with internal diameters between about 1.5 and 3.0 mm.

In another embodiment, a system for alloy sample formation according to the above-disclosed methods is disclosed, comprising the above-disclosed feed-head and further comprising: mechanisms for applying controlled relative displacement and/or rotation of feed-head and work-piece; at least two wire feeders and controllers for the at least two-wire feeders; and a directional heat source coupled to the feed-head.

In other embodiments, the system further comprises a chamber enclosing the multi-wire feed head and work-piece configured to allow back-filling with an inert gas, and a flowing inert gas shield configured to enclose at least a fraction of the downward-facing surface and the heat-affected region comprising the sample and/or at least a portion of the work-piece surface.

BRIEF DESCRIPTION OF THE FIGURES

FIGS. 2A through 2H show various stages in the formation of alloy samples.

Various features of the invention are described herein with reference to the figures, the written description and claims. These features may be combined with or interchanged in any permutation other than one in which the features are mutually exclusive. Comprising is used to mean including but not limited to the referenced features. Unless otherwise specified, work-piece and work-piece surface are used to refer to the object and surface onto which deposition is performed, which may include a substrate, not necessarily comprising the metal or alloy being deposited, and may include already deposited metal or alloy material, including a portion of a metal or alloy component. Adjacent is used to mean proximate, though not in contact with. Abutting is used to mean in contact with.

DETAILED DESCRIPTION

In the following, systems and methods for implementing various embodiments of the invention are described, comprising a directional heat source and a feed-head configured to feed the ends of one or more of multiple wires having diverse compositions into a heat-affected region at the surface of a work-piece, allowing selected lengths of two or more wires to be melted, combined into a substantially uniform molten alloy portion, cooled, and solidified to form a solid alloy portion having a defined composition.

Figure 1:
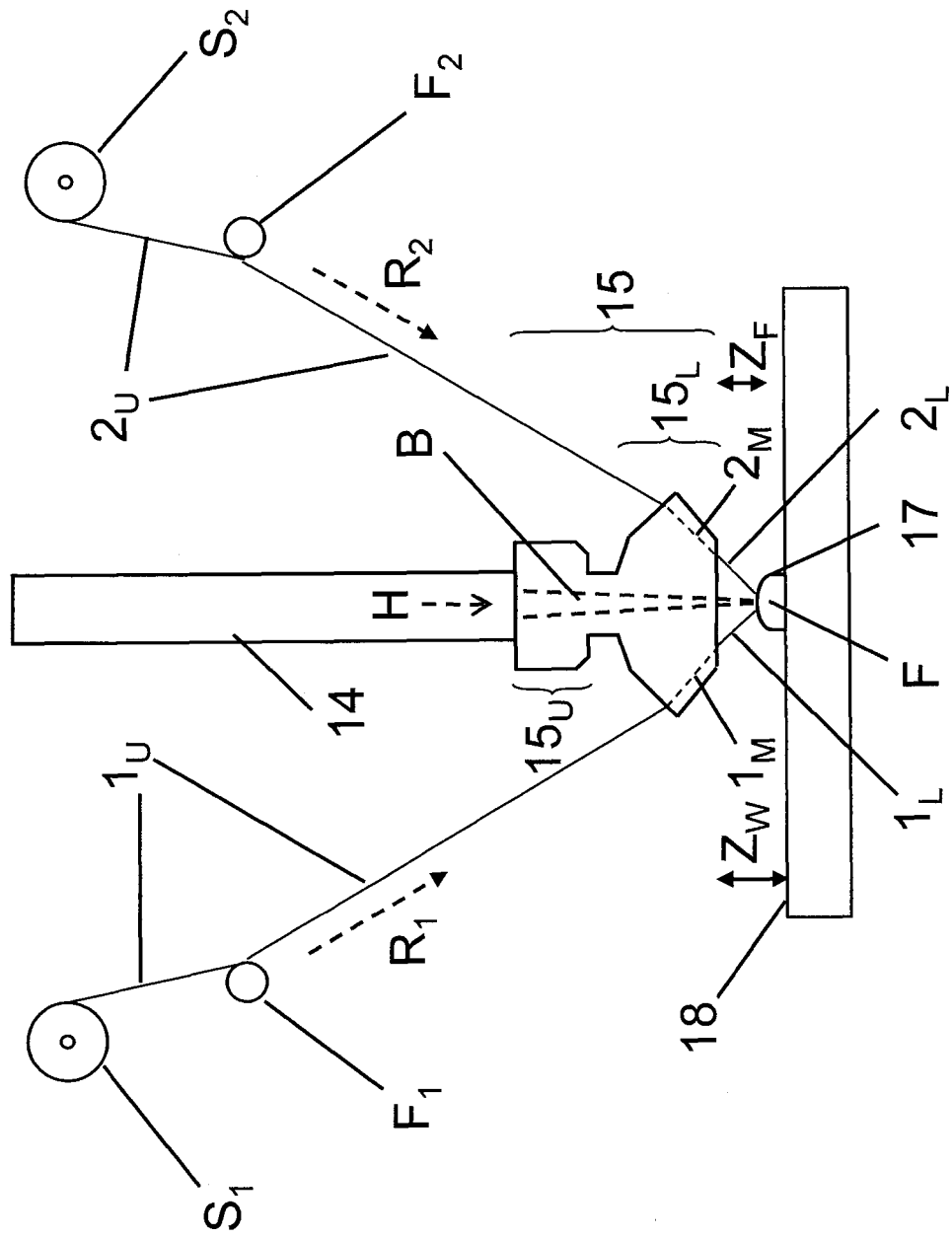
FIG. 1 is a schematic of a system suitable for implementing embodiments of the invention.

FIG. 1 is a schematic of a part of a system suitable for practicing various embodiments of the invention. A multi-wire feed-head 15 and directional heat source 14 are shown aligned along a common longitudinal axis, indicated by the dashed arrow, normal to horizontal and flat work-piece surface 18. (In general, work-piece surface 18 need not be flat or horizontal, and head 15 and heat source 14 need not share a common longitudinal axis aligned vertically or normal to the surface of work-piece 18.) Head 15 is shown comprising an upper section $15_U$, coupled to a directional heat source 14, and a lower section $15_L$ having a flat and horizontal downward-facing surface disposed a vertical distance $Z_W$ above work-piece surface 18. (As discussed below, the downward facing surface need not be flat or horizontal.)

Heat output H from heat source 14 travels along path B, shown bounded by the dashed lines and aligned with the longitudinal axis of heat source 14 and head 15, exits from lower head section $15_L$ and impinges on a portion of sample 17, shown formed on work-piece surface 18. (In general, the heat path B need not be aligned with the common longitudinal axis of heat source 14 and head 15, nor aligned normal to original work-piece surface 18, and heat output H may be attenuated between leaving source 14 and reaching the surface of sample 17 or original work-piece surface 18.)

Directional heat source 14 may be one of several types, including a laser (as in the binary alloy examples given below) electron beam or plasma arc, and its output need not have the convergent, straight-sided profile shown.

The ends of lower portions of a multiplicity of wires may be fed from the downward-facing surface of lower head section $15_L$ along directions (defined by the directions of the longitudinal axes of the elongated channels traversing the head, as discussed below) that converge on a common focus F located a distance $Z_F$ below the downward-facing surface along the longitudinal axis of head. (In general, each of the multiplicity of wires traversing head 15 need not be fed towards the same common focus, as also discussed below.) The multiplicity of wires may comprise wires consisting of elements or alloys and may comprise wires having diverse cross-sectional areas. Continuous wires 1 and 2, consisting of materials $M_1$ and $M_2$, are shown in FIG. 1 as comprising upper portions $1_U$ and $2_U$—originating on spools $S_1$ and $S_2$, being impelled at rates $R_1$ and $R_2$ by feeder drive wheels $F_1$ and $F_2$ towards entrances (not shown) disposed across an upward-facing surface of lower section $15_L$—middle portions $1_M$ and $2_M$—traversing lower head section $15_L$, as shown by the dashed lines, through elongated channels (not shown)—and lower portions $1_L$ and $2_L$—extending from exits (not shown) disposed across a downward-facing surface of lower head section $15_L$ towards sample 17. The feed rates $R_1$ and $R_2$ (typically expressed in units of mm/s) imparted to wires 1 and 2 may be controlled independently, including being accelerated, decelerated, started and stopped independently. (Only wires 1 and 2 are illustrated. However, further wires 3 through N may be fed at variable rates $R_3$ to $R_N$ through head 15 towards sample 17, where N is the number of available wire channels, equal to eight in FIGS. 4A and 4B, twelve in the head used to fabricate the alloy examples discussed below, and may be up to around fifty, as discussed below.)

As shown in FIG. 1, for a given heat output H from source 14 (possibly assisted by heat from other sources, as discussed below) over a given path B, feed rates $R_1$ and $R_2$ of wires 1 and 2 may be regulated such that the converging ends of lower portions $1_L$ and $2_L$ are continuously melted upon entry into a heat-affected region formed at the intersection of heat path B with the surface of sample 17 or original work-piece surface 18. In FIG. 1, the heat-affected region (not shown) may be a molten alloy portion (also referred to as a melt pool) at the surface of sample 17 extending beyond the boundaries of path B (as shown in FIGS. 2D and 2H) into which volumes of materials $M_1$ and $M_2$ from wires 1 and 2 are continuously incorporated at rates $R_1A_1$, and $R_2A_2$, where $A_1$ and $A_2$ are the cross-sectional areas of wires 1 and 2. The size of the heat-affected region may vary over the growth of sample 17. As explained below with reference to FIG. 2, when heat source 14 is first directed towards original work-piece surface 18, the heat-affected region may be essentially confined to the intersection of path B with work-piece surface 18 (corresponding, for example, to a laser spot on the substrate surface), while at later stages in the growth of a sample 17, the heat-affected region may be a molten alloy portion (or melt pool) encompassing all or part of sample 17.

Stages in the growth of an alloy sample 17 on the surface of work-piece 18 according to an embodiment of the invention are shown in FIGS. 2A to 2D. Feed-head 15 is not shown, though the vertical distance from the surface of lower head section $15_L$, from which wires 1 and 2 exit, to a horizontal and flat portion of original work-piece surface 18 is indicated in each figure. (For convenience, vertical, horizontal, upward-facing and downward-facing are used to refer to the relative orientation of work-piece and head, though, as already noted, the work-piece surface need not be perfectly horizontal and the longitudinal orientation of the head need not be aligned perfectly along a vertical direction above the work-piece surface.) The path B of the heat output, also aligned vertically and normal to horizontal work-piece surface 18, is indicated by the converging dashed lines labeled B. The heat output H and path B are unchanged between FIGS. 2A, 2B, 2C and 2D.

FIG. 2A shows original work-piece surface 18 disposed a distance $Z_F$ below lower head section 15$_L$, measured from the exit of the heat-directing channel, with common wire focus F in the plane of original work-piece surface 18. In general, focus F may lie below or above a work-piece surface 18. Heat path B is shown intersecting a circular region of work-piece surface 18 with diameter $Y_B$ centered on common focus F. The end of lower portion 1$_L$ of wire 1 is shown being fed at a fixed rate $R_1$ towards common focus F, extending as far as the edge of heat path B in a straight line. (In general, the heated wire may flex, or melt, before it reaches the boundary of path B, and may extend into the center of path B in a straight line, depending on factors such as the feed rate $R_1$, heat output H, size of path B, and the sequence in which wire feed and directional heat source are applied.)

FIG. 2B shows the end portion 1$_L$ having been fed at rate $R_1$ for a time interval $T_N$ to melt a volume $R_1 A_1 T_N$ of wire 1 to form a molten nucleus 17$_N$ with diameter $Y_N$ of material $M_1$ on original work-piece surface 18. The lower portion 2$_L$ of wire 2 is also shown, being fed at a fixed rate $R_2$ towards, but having not yet reached, molten nucleus 17$_N$. (Though the diameter $Y_N$ of molten nucleus 17$_N$ is shown as greater than the diameter of region $Y_B$, formed by the intersection of heat path B with original work-piece surface 18, the end of lower wire portion 2$_L$ may be brought into contact with a molten nucleus having a diameter $Y_N$ which is smaller than $Y_B$, as in FIG. 2F).

Figure 2C:
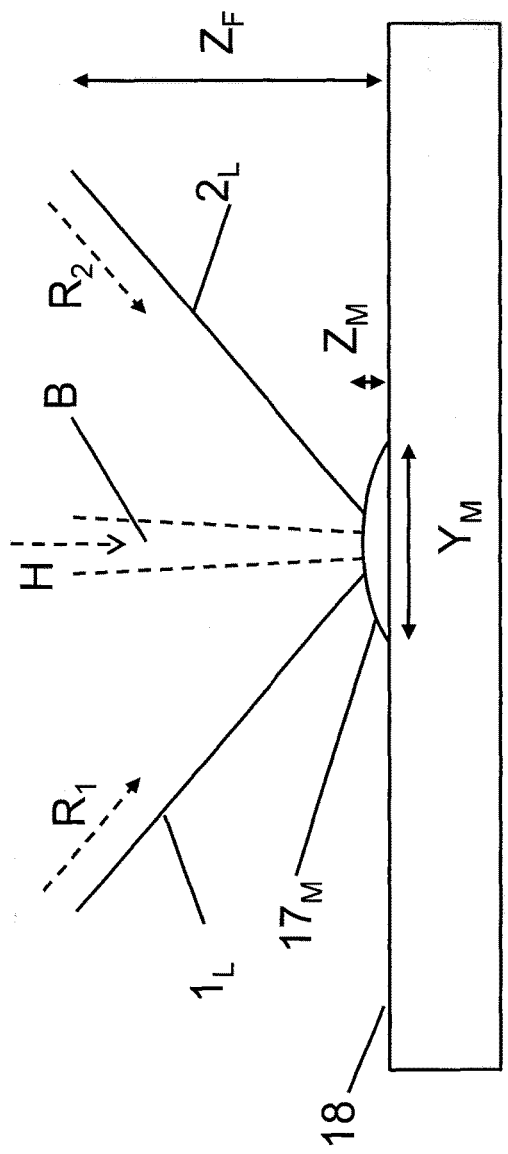
Figure 2D:
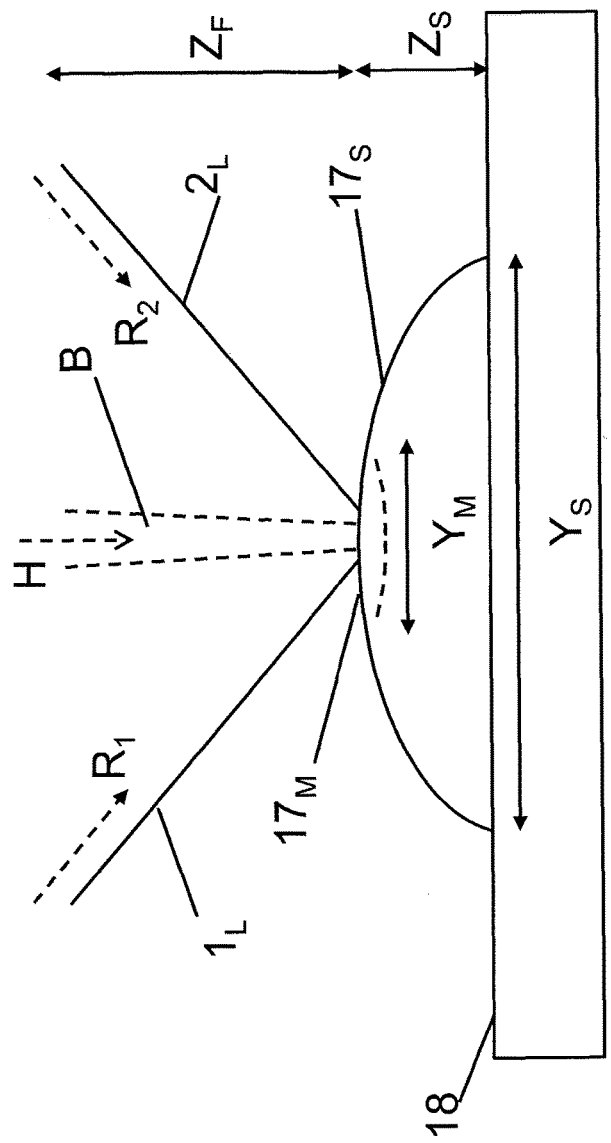

FIG. 2C shows the ends of lower portions 1$_L$ and 2$_L$ of wires 1 and 2 having been fed at fixed rates $R_1$ and $R_2$ over a further time interval $T_M$, in a case where $T_N$ is a small fraction of $T_M$, and melted to form a molten portion 17$_M$ with diameter $Y_M$ and height $Z_M$ comprising a mixture of materials $M_1$ and $M_2$ from selected lengths $L_1$, equal to $R_1 T_M$, and $L_2$, equal to $R_2 T_M$, of wires 1 and 2. (In general, rates $R_1$ and $R_2$ need not be fixed during time interval $T_M$, so long as the selected lengths $L_1$ and $L_2$ of wires 1 and 2 may be regulated, for example, by integrating variable rates $R_1$ and $R_2$ over $T_M$, or by applying another direct or indirect measurement of $L_1$ and $L_2$ allowing regulation of $L_1$ and $L_2$.)

Setting aside the contribution from nucleus 17$_N$ as negligible (which need not be the case, such as where the nucleus forms a fraction of a selected length), and possible losses or gains of material, due to evaporation, diffusion, etc., molten portion 17$_M$ will consist of an amount of material $M_1$ equivalent to a solid volume $L_1 A_1$ of material $M_1$ and an amount of material $M_2$ equivalent to a solid volume $L_2 A_2$, material $M_2$. By regulating selected lengths $L_1$ and $L_2$, for given cross-sectional areas $A_1$ and $A_2$, the composition of molten alloy portion 17$_M$ may be defined as $L_1 A_1$, parts material $M_1$ and $L_2 A_2$ parts material $M_2$. With cross-sectional areas $A_1$ and $A_2$ essentially constant over the length of each of wires 1 and 2, the composition of molten alloy portion 17$_M$ may be defined by regulating the relative proportions of selected lengths $L_1$ and $L_2$. Further, where feed rates $R_1$ and $R_2$ are fixed over interval $T_M$, the composition of molten alloy portion 17$_M$ may be defined by regulating the relative proportions of feed rates $R_1$ and $R_2$. (In the special case where $R_1$ and $R_2$ vary over interval $T_M$, but always in a fixed proportion, a similar relationship may be established.) For example, where equal cross-sectional area wires 1 and 2 consists of elements $E_1$ and $E_2$, a binary alloy, having a defined composition of $R_1$ parts $E_1$ and $R_2$ parts $E_2$, may be formed by regulating the feed rates $R_1$ and $R_2$ over a time interval $T_M$. As another example, again for equal cross-section wires, where wire 1 consists of an equal mixture of elements $E_1$ and $E_2$, and wire 2 consists of element $E_3$, a tertiary alloy having a defined composition $R_1/2$ parts $E_1$, $R_1/2$ parts $E_2$ and $R_2$ parts $E_3$, may be formed by regulating the fixed feed rates $R_1$ and $R_2$.

Given sufficient convection and diffusion within molten portion 17$_M$, a substantially homogeneous mixture may be formed between materials $M_1$ and $M_2$. (The molten portion may not be completely homogeneous, having, for example, locally higher concentrations of $M_1$ and $M_2$ where the ends of wires 1 and 2 enter, so long there is sufficient mixing within the volume before all or part of the molten alloy portion solidifies.) Having grown, as shown in FIG. 2C, with the molten portion extending beyond the boundaries of heat path B, the wire feeds may be stopped and the heat output removed, and molten portion 17$_M$ cooled to form a substantially homogeneous solid alloy portion 17$_S$ having the same composition as molten portion 17$_M$, as defined by regulating rates $R_1$ and $R_2$.

On the other hand, molten alloy portion 17$_M$, having reached a given size, may begin to solidify, once the heat output H entering along path B is insufficient to maintain the entire sample in a molten state, as heat is continuously lost from the boundaries of the molten portion furthest from heat path B, through radiation, conduction, etc. For a given heat output H entering along path B, a given composition substrate (original work-piece), and given materials $M_1$ and $M_2$ being fed at given rates $R_1 A_1$ and $R_1 A_1$, a molten portion 17$_M$ may be formed with a certain maximum size before solidification begins. (As discussed below additional heat may be delivered to the molten and solid alloy portions and work-piece, in an effort to retard solidification.)

FIG. 2D shows the result of feeding wires 1 and 2 at fixed rates $R_1$ and $R_2$ over a further time interval $T_S$, which is long enough for the molten portion to have grown beyond a maximum molten size, while at the same time increasing the vertical separation between head and original work-piece surface 18 by an amount $Z_S$, where $Z_S$ is the increase in height of sample 17 due to formation of solid portion 17$_S$ during time interval $T_S$. Alloy sample 17 is shown comprising an upper molten portion 17$_M$ with substantially the same diameter $Y_M$ and composition as the molten portion shown in FIG. 2C, and a larger solid portion 17$_S$, with diameter $Y_S$ and height $Z_S$, formed underneath molten portion 17$_M$. (The boundary between molten and solid portions is shown by the dashed line, but need not follow the contour indicated). Molten portion 17$_M$ may attain and maintain an essentially constant size and be maintained at fixed distance below the head, with a composition defined by the relative proportions of rates $R_1$ and $R_2$, by compensating the increase in elevation of molten portion 17$_M$, caused by the incorporation of materials $M_1$ and $M_2$ at rates $R_1 A_1$ and $R_2 A_2$ into the solid portion 17$_S$ of sample 17, throughout a time interval $T_S$. Where interval $T_S$ is significantly longer than $T_M$, a solid alloy portion 17$_S$ significantly larger than molten portion 17$_M$ may be formed.

By increasing the vertical separation between head and work-piece at an essentially constant rate $Z_S/T_S$ over time $T_S$, and introducing molten materials $M_1$ and $M_2$ at fixed rates $R_1A_1$ and $R_2A_2$ into molten portion $17_M$ having an essentially constant diameter $Y_M$ over time $T_S$, substantially homogeneous molten material may be maintained and solidified under stable conditions, and a substantially homogeneous microstructure formed in the solid alloy portion $17_S$. Once time interval $T_S$ has elapsed, wire feeds 1 and 2 and the heat output may be stopped, or simply removed, allowing residual molten portion $17_M$ to solidify completely. Heat delivery may also be diminished gradually, to control the cooling rate of residual molten portion $17_M$ and solid portion $17_S$.

In order to ensure complete melting of wires 1 and 2 upon introduction into the heat-affected region, and avoid premature solidification of molten alloy portion $17_M$, for given cross-sectional areas $A_1$ and $A_2$, and compositions $M_1$ and $M_2$, and for a given heat output H over path B, feed rates $R_1$ and $R_2$ may be kept below threshold values. Where the ends of lower portions $\mathbf{1}_L$ and $\mathbf{2}_L$ are fed into molten portion $17_M$ but outside the intersection of path B (as in FIGS. 2C and 2D), these threshold values may depend on additional factors, such as the distances from the wire entry points to the boundaries of path B and solid portion $17_S$.

The method shown in FIGS. 2A to 2D may be generalized to three, four or more wires, and to the formation of tertiary, quaternary, or higher, molten alloys having any of a range of defined compositions. FIGS. 2E to 2H show stages in the production of tertiary alloy from wires 1, 2 and 3, each composed of different elements $E_1$, $E_2$ and $E_3$, with the process viewed from the head looking down onto the work-piece surface 18.

FIG. 2E show the end or lower portion $\mathbf{1}_L$ of wire 1 extending from an exit in the lower surface of the head (not shown) having been fed at a fixed rate $R_1$ and just reached path B. The lower portions $\mathbf{2}_L$ and $\mathbf{3}_L$ of stationary wires 2 and 3 are shown extending slightly below the lower head surface from their respective channel exits. (Unlike the embodiment shown in FIGS. 4A and 4B, the head employed in FIGS. 2E to H is capable of introducing lower wire portions with three-fold symmetry.)

FIG. 2F shows the end portion $\mathbf{1}_L$ of wire 1 having been fed at rate $R_1$ over time interval $T_{N1}$ and melted to form to a molten nucleus $17_{N1}$ on surface 18. Lower portion $\mathbf{2}_L$ of wire 2 is stationary and lower portion $\mathbf{3}_L$ of wire 3 is shown being fed from the head at a fixed rate a $R_3$ towards, but having not yet reached, molten nucleus $17_{N1}$, which has a diameter smaller than that of heat path B.

In FIG. 2G, a further time interval $T_{N3}$ has passed, and the ends of lower portions $\mathbf{1}_L$ and $\mathbf{3}_L$ of wires 1 and 3 are shown being fed at fixed rates $R_1$ and $R_3$ into nucleus $17_{N13}$, which consists of elements $E_1$ and $E_3$. The end of lower portion $\mathbf{2}_L$ of wire 2 is shown being fed from the head at rate a $R_2$ towards, but having not yet reached, molten nucleus $17_{N13}$, which is shown with a diameter smaller than heat path B. The sequence of introduction of the ends of wires 3 and 2 into the nucleus first formed from wire 1 may be reversed and, in some circumstances, wires 3 and 2 may be introduced at the same time.

In FIG. 2H, a time interval $T_M$ has passed since the end of lower portion $\mathbf{2}_L$ of wire 2 made contact with nucleus $17_{N13}$, during which the ends of the lower portions of wires 1, 2 and 3 have been fed and melted at fixed rates $R_1$, $R_2$ and $R_3$ to form molten portion $17_M$, formed from selected lengths $L_1$, $L_2$ and $L_3$, equal to $T_MR_1$, $T_MR_2$ and $T_MR_3$, of wires 1, 2 and 3. Under appropriate conditions, molten portion $17_M$, shown having grown in time $T_M$ to a diameter greater than heat path B, formed form volumes $L_1A_1$, $L_2A_2$ and $L_3A_3$, where $A_1$, $A_2$ and $A_3$ are the cross-sectional areas of wires 1, 2 and 3, may be substantially homogeneous. As discussed above, setting aside negligible contributions from nucleus $17_{N13}$, and possible additions or losses of material, the composition of molten tertiary alloy portion $17_M$ may be defined by appropriately regulating the relative proportions of fixed feed rates $R_1$, $R_2$ and $R_3$. For example, where $A_1$, $A_2$ and $A_3$ are equal, molten tertiary alloy portion $17_M$ may be formed consisting of $R_1$ parts $E_1$, $R_2$ parts $E_2$ and $R_3$ parts $E_3$.

As discussed for samples formed from two wires, heat output H may be maintained over beam path B, and wire feed rates maintained at $R_1$, $R_2$ and $R_3$, over a further time interval $T_S$, during which a gradual compensatory increase in the vertical separation between head and work-piece is applied, equivalent to the height $Z_S$ of the solid alloy portion formed over time $T_S$, allowing formation of a solid alloy portion $17_S$ that is significantly larger than molten alloy portion $T_M$, albeit with the same composition, defined by regulating the proportions of $R_1$, $R_2$ and $R_3$. As also discussed above for samples formed from two wires, after time interval $T_S$ has elapsed, wire feeds 1, 2 and 3, and the heat output may be stopped, or simply removed, allowing sample 17 to solidify completely.

As described above, the feed rates of one or more of a multiplicity of wires having diverse compositions may be regulated independently to form, from selected wire lengths, a molten alloy portion having a desired composition. Though the feed rates of the one or more wires used to form a sample need not be fixed over an entire deposition interval (or intervals), fixed feed rates, or at least fixed feed rate ratios, may be used for simplicity, stability and ease of process control, particularly in the method discussed above, in which the vertical separation of head and work-piece is increased, during a second deposition interval, to compensate for solidification during deposition. As also mentioned above, alloy wires of known composition may be substituted for one or more of the elemental wires, to reduce the number of wire feeds required to form a desired alloy composition consisting of a given number of elements.

As already noted, for materials which are not available in wire form, one or more powder streams may also be used in combination with the wire feeds. The rate of the powder feed may be regulated using known methods, in which a powder is typically introduced with an inert gas stream. One or more reactive gases may also be used to introduce additional elements into molten or solid alloy samples. Such reactive gases may be introduced as a fixed background pressure or a jet, optionally passing through one of the elongated channels in the head, or may be combined with the inert gas in the powder streams. Since the incorporation rate of material in powder and gas form may not be regulated as directly as a wire feed, powder and gas feed rates may need to be calibrated for each set of processing conditions.

For certain combinations of wire materials and feed rates (and optionally powder/gas streams and feed rates), particularly those involving high melting point materials and high feed rates, heat output H exiting head 15 may not be large enough to form a sufficiently homogeneous molten alloy portion. In such cases, a second directed heat source, for example, a $CO_2$ laser not coupled to head 15, may be used to deliver additional heat to the molten alloy portion, and/or to reduce heat losses by heating the adjacent work-piece surface or solid alloy portions. (The binary alloy examples given below, portions of which solidified during deposition as the vertical distance from head to original work-piece surface separation increased, were not prepared using an additional heat source, and yet yielded homogeneous solid alloy samples.) Wires or powder feeds may also be preheated, to further increase heat delivery to the sample. Conversely, in order to reduce heat loss from the molten and solid alloy portions, the work-piece may be heated, for example, using a resistance heater, based on nichrome or molybdenum disilicide, an infrared radiation heater or an induction heater. As already mentioned, the lower surface of the feed head may also be shaped to focus radiated or reflected heat towards the sample.

Each of the methods discussed above, for increasing the heat delivery to or decreasing the heat loss from a molten alloy portion, may also be used to affect the thermal histories of solid alloy portions formed during the deposition process. A fully solidified alloy sample may also be cooled at a defined rate, or given diverse heat treatments, by selective application of the additional directional heat source, and/or the directed heat source coupled to the head (with the wire/powder feeds stopped and a suitably-adjusted beam path). Solidified alloy samples may also be heated indirectly, by heating the work-piece by any of the methods mentioned above. Conversely, alloy samples may be cooled indirectly, by cooling the work-piece, during and after deposition, by placing the work-piece in thermal contact with a cooled body, such as a copper plate through which cooling water is circulated.

The methods and systems described herein, comprising a multi-wire feed-head, for formation of a single alloy sample having a defined composition may be extended to form combinatorial series or libraries of alloy samples having diverse compositions and processing/thermal histories distributed in different locations across a work-piece surface, optionally in a regular array on a flat surface. Combinatorial series or libraries may be formed by systematically changing the defined composition and processing conditions/thermal histories between samples and applying controlled relative motion (rotation and/or displacement) of the head and work-piece to address different work-piece surface locations. For example, with a head configured to feed three elemental wires, as discussed above and illustrated in FIGS. 2E to 2H, by systematically changing the feed rates of the three wires between samples, a multiplicity of alloy samples having diverse compositions may be formed on different locations of a work-piece surface, allowing exploration of the phase space of the tertiary alloy system. (Series is used here to mean changing one variable, and library, more than one.) By adding an additional elemental wire, elemental powder feeder, or reactive gas source, a quaternary alloy system may be investigated. As already noted, other configurations, involving alloy wires, may be used to explore quaternary and higher alloy systems. Further, the effect of diverse processing conditions within such alloy series or libraries may be investigated by applying different thermal processing histories to different samples, using the methods discussed above. The wire feeds may be stopped completely as head and work-piece are moved between samples, or may be adjusted to maintain one or more wire feeds, suitable for forming a nucleus for the next sample in the series or library.

The methods and systems described herein, comprising a multi-wire feed-head, may also be used for additive manufacturing of alloy components, by implementing well known control technologies to apply successive layers of alloys (possibly interspersed with layers of elements) to selected regions of a work-piece surface. As the defined composition of a component may be changed during formation of a component, diverse compositions within components may be created using the multi-wire feed-head.

Figure 3:
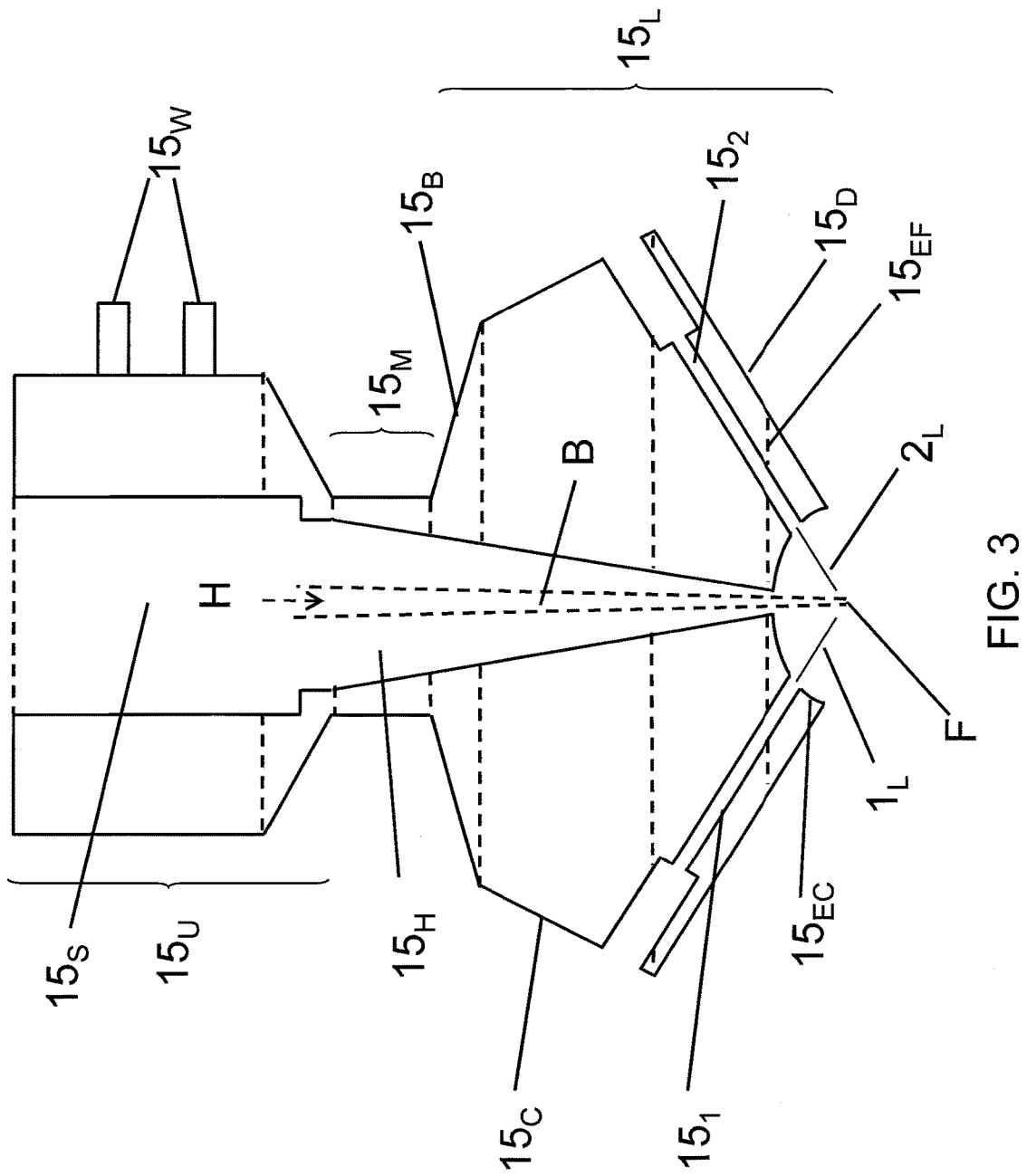
FIG. 3 is a longitudinal section of a multi-wire feed-head suitable for implementing embodiments of the invention.

A longitudinal section through the axis of a suitable multi-wire feed-head is shown in FIG. 3. Head 15 comprises upper, middle and lower sections, $15_U$, $15_M$ and $15_L$, and may be manufactured as a single piece of material, such as a copper alloy, or assembled form one or more sections or subsections. Upper section $15_U$ couples to heat source 14 and middle section $15_M$ (shown, but not labeled in FIG. 1), and encloses cavity $15_S$, which is configured to accept at least part of heat source 14 (for example, part of a $CO_2$ laser or laser optics package) and abut the top of heat-delivery channel $15_H$, which is shown having a substantially conical inner surface (though other forms may be used) and extending from cavity $15_S$ through a portion of section $15_U$, traversing sections $15_M$ and $15_L$, and exiting a downward-facing surface of lower section $15_L$. Middle section 15M is also coupled to lower section $15_L$, shown in FIG. 1 being traversed by portions $1_M$ and $2_M$ of wires 1 and 2 and disposed a distance $Z_W$ above original work-piece surface 18. FIG. 3 shows upper section $15_U$ having an inlet and outlet, collectively $15_W$, for a cooling liquid, typically water. (The internal cooling channel or channels between inlet and outlet 15W are not shown, though they may extend into sections $15_M$ and $15_L$.)

As in FIG. 1 and elsewhere, the longitudinal head axis, along which the heat output H from heat source 14 is directed, is indicated by a dashed arrow and the extent of heat path B by dashed lines. (The inside of heat delivery channel $15_H$ may be polished or have a reflective or heat resistive coating applied and, where a laser heat source is used, one or more heat transparent windows, not shown, may also be introduced.) Wire lower portions $1_L$ and $2_L$ of wires 1 and 2 are shown extending in straight lines towards a common focus in the center of heat path B, though they wires may flex or melt. Because the heat-affected region at a sample or work-piece surface may extend well beyond path B, all the wire channels need not be focused exactly on the center of the heat path B, though the symmetrical, co-focused, arrangement shown in FIG. 3 offers advantages, as discussed below.

As also shown in FIG. 3, head section $15_L$ is bounded by upward-facing surface $15_B$, an axially symmetric section of a conic surface, and upward-facing surface $15_C$, a second axially symmetric section of a conic surface. The lower portion of lower head section $15_L$ is bounded by downward-facing surface $15_D$, a third axially symmetric section of a conic surface, and a lower surface, which may be flat (solid line $15_{EF}$) or concave (dashed line $15_{Ec}$), for example, hemispherical, configured to reflect and concentrate heat towards the converging ends of one or more lower wire portions and alloy sample 17, as already mentioned.

In FIG. 3, elongated wire channels $15_1$ and $15_2$ are shown traversing lower head section $15_L$ and running between wire entrance openings disposed on surface $15_C$ and wire exit openings located on concave surface $15_{EC}$. Wire channels $15_1$ and $15_2$ may have a circular cross section and comprise a wider entrance portion, as shown, which may facilitate attachment of the wire feed mechanism, and an exit constriction (not shown) intersecting concave downward-facing surface $15_{EC}$ or $15_{EF}$, guiding the exiting wire lower portion along the channel axis. (The liner tubes extending below the head shown below in FIG. 6, may also have constrictions at their exits.) Channel lengths, channel widths and exit constrictions, may be configured to guide the wire towards a common focus without imparting undue resistance. Typical internal channel diameters may vary between 1.5 and 3.0 mm and channel lengths between 15 and 50 mm. The size of the wire exit constriction may depend on the diameter of the wire. For example a 0.5 mm diameter wire may have a 0.7 mm diameter exit constriction, as in the feed head used to produce the alloy examples discussed below. The inclination of the longitudinal axes of the elongated wire channels may be varied between 5 and 85 degrees from the longitudinal head axis, with an inclination of around 45 degrees being typical.

Figure 4B:
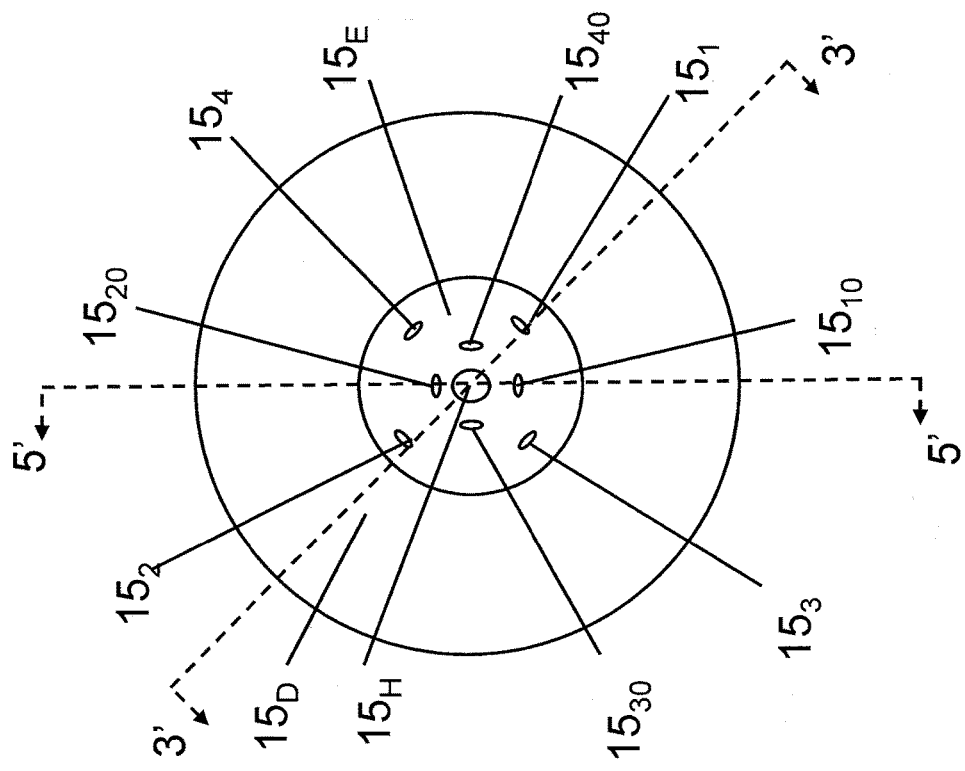
FIGS. 4A and 4B show top and bottom views of the lower portion of a multi-wire feed-head suitable for implementing embodiments of the invention.
Figure 4A:
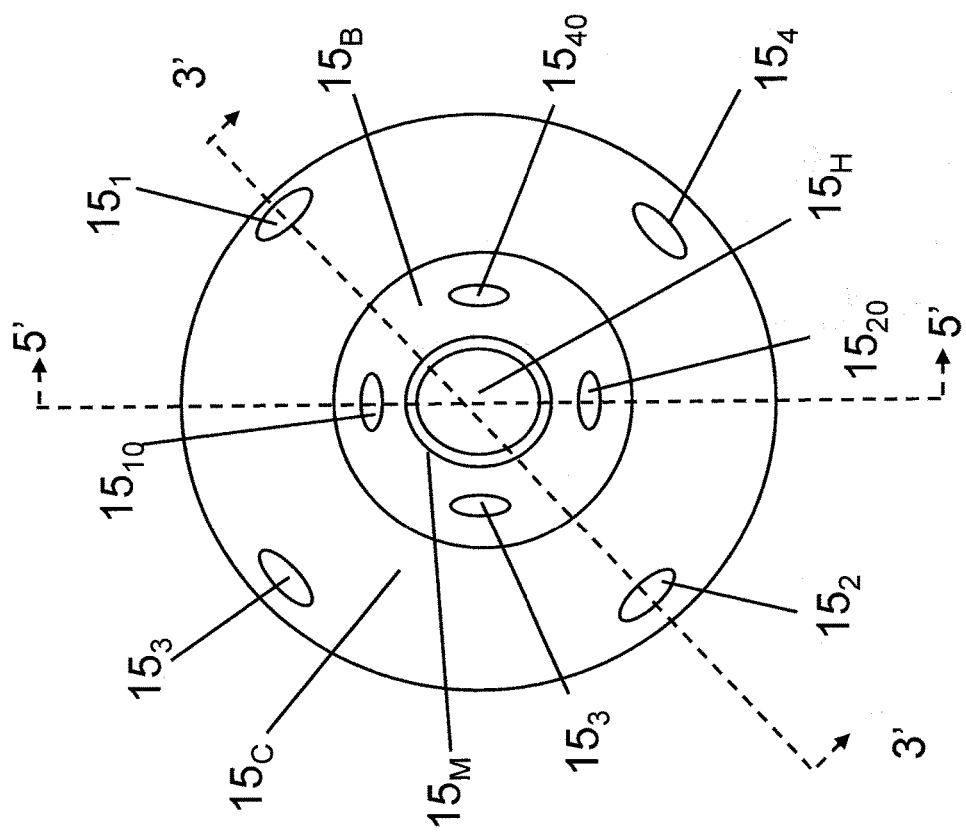

FIG. 4A is a view of head sections $15_M$ and $15_L$ seen from above, showing middle section $15_M$ and axial heat-delivery channel $15_H$, upward-facing surface $15_C$, with entrances of wire channels $15_1$, $15_2$, $15_3$ and $15_4$ disposed in a four-fold symmetric arrangement, and upward-facing surface $15_B$, with entrances of wire/powder channels $15_{10}$, $15_{20}$, $15_{30}$ and $15_{40}$ also disposed in a four-fold symmetric arrangement. FIG. 4B is a view of head 15 from below, showing downward-facing surface $15_D$ and downward-facing concave surface $15_{EC}$, with the exit of axial heat-delivery channel $15_H$ and the exits of wire channels $15_1$, $15_2$, $15_3$ and $15_4$ and wire/powder channels $15_{10}$, $15_{20}$, $15_{30}$ and $15_{40}$, each set of exits disposed in a four-fold symmetric arrangement. In FIGS. 4A and 4B, the longitudinal sectional views of FIGS. 3 and 5 are marked by the dashed lines and arrows labeled 3' and 5'.

Figure 5:
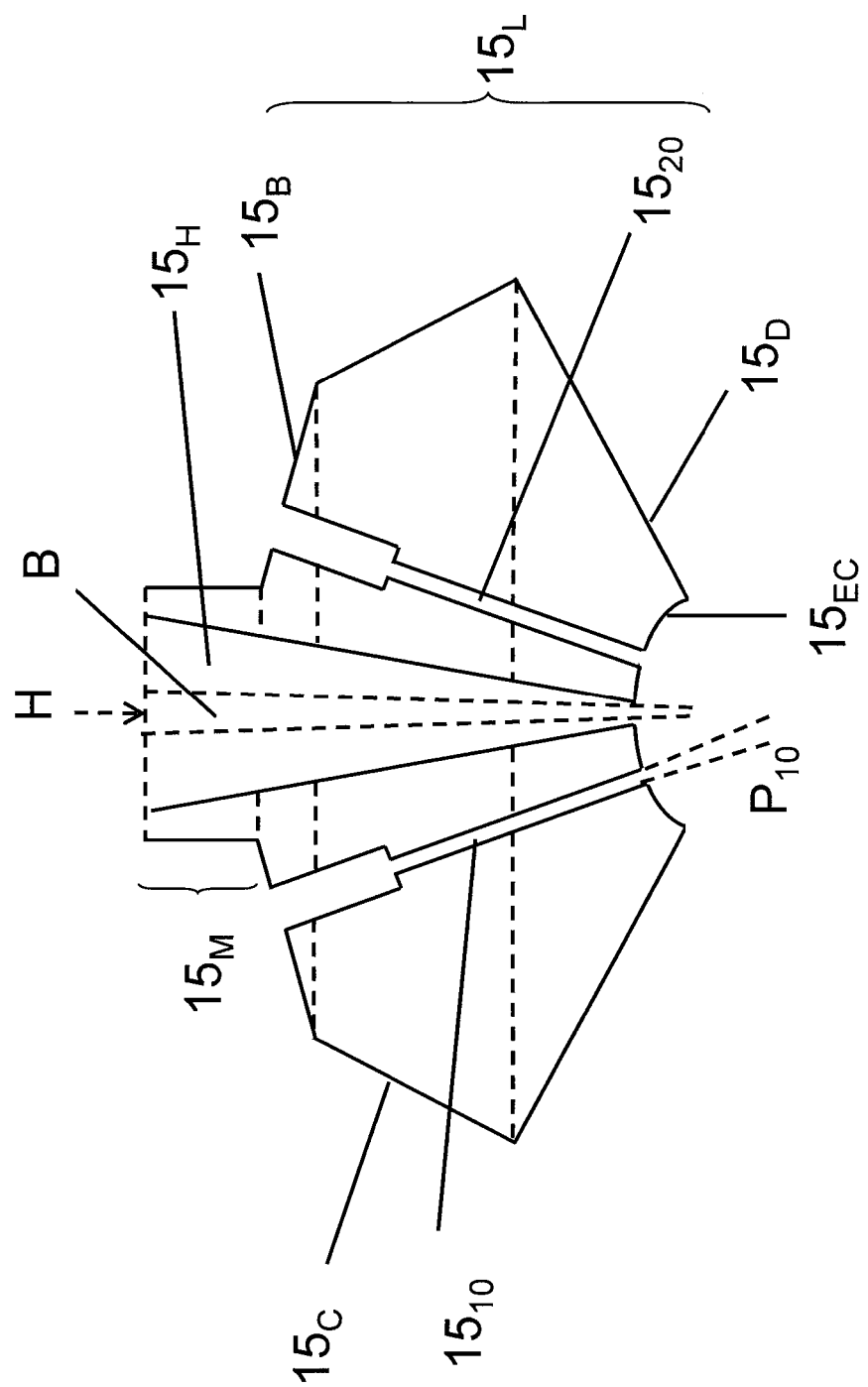
FIG. 5 is a longitudinal section of the lower portion of a wire-fed head suitable for implementing embodiments of the invention.

FIG. 5 is a longitudinal section of head sections $15_M$ and $15_1$ showing wire/powder channels $15_{10}$ and $15_{20}$ intersecting surfaces $15_B$ and $15_{EC}$, having a circular cross section and comprising a wide entrance section intersecting surface $15_B$ and a narrower section intersecting concave surface $15_{EC}$. Where such channels are used to feed wire, they may further comprise a constriction at the exits and have the dimensions noted above with relation to channels $15_1$ through $15_4$. Where channels $15_{10}$ or $15_{20}$ are used for powder streams, optionally comprising an inert or reactive gas, as indicated by the stream $P_{10}$, the interior diameter of the powder feed channels may be between around 0.5 and 3.0 mm, typically around 1.6 mm. The longitudinal axes of elongated powder delivery channels may be disposed at angles less than 45 degrees to the longitudinal head axis, typically around 20 degrees, in order to reduce the horizontal area onto which the divergent powder stream is projected.

Figure 6:
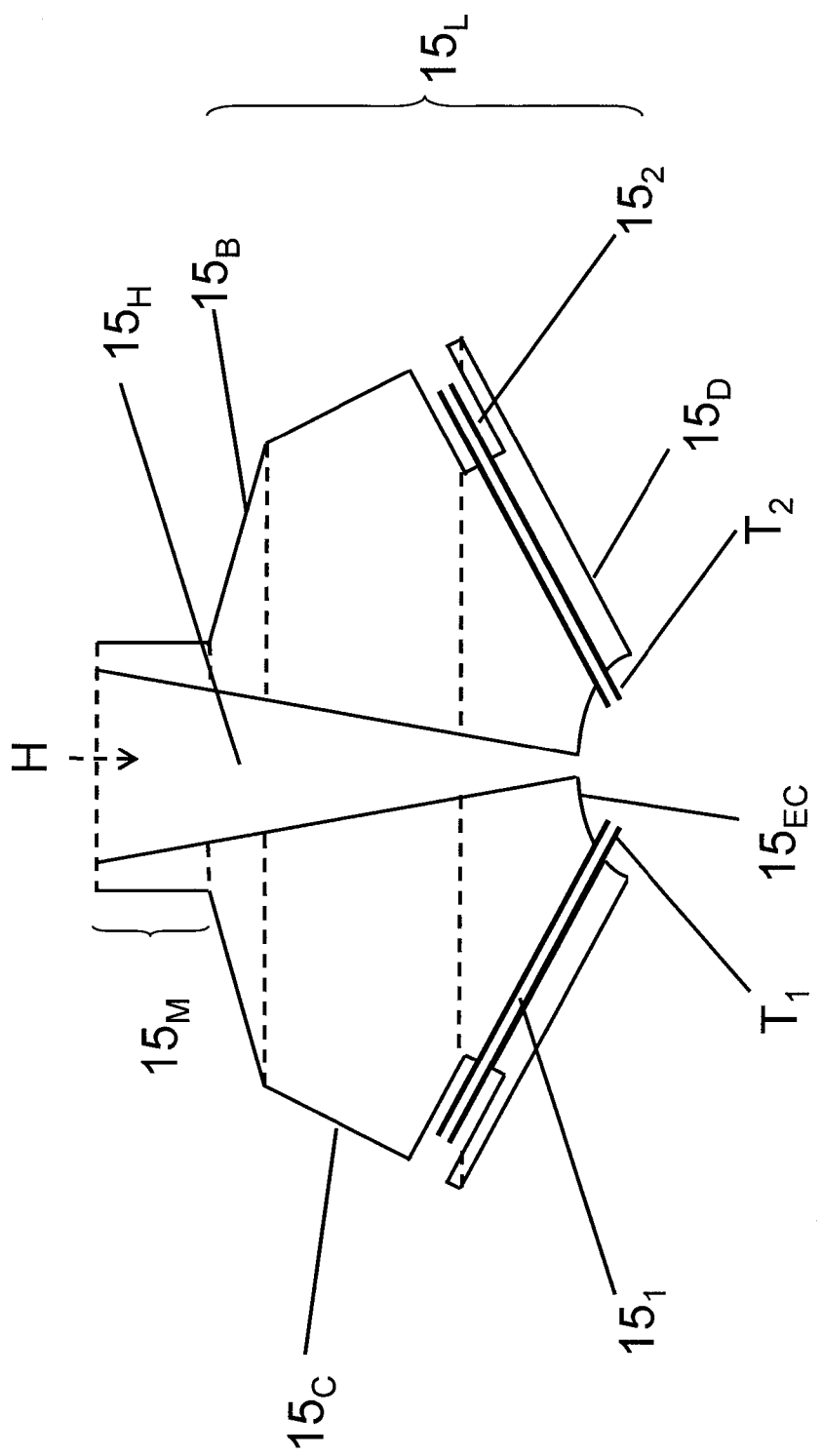
FIG. 6 is a longitudinal section of the lower portion of a wire-fed head suitable for implementing embodiments of the invention.

In FIG. 6, wire delivery channels $15_1$ and $15_2$ are shown lined with tubes, $T_1$ and $1_2$, which may extend beyond surface $15_{EC}$, as shown, in order to further improve the precision and accuracy of wire delivery towards a common focus. In which case, the larger diameter entrance portion of the wire channels shown in the figure may facilitate exchange of liner tubes and their attachment to wire feeders. The liner tube may be made from a different material from the head, in order to improve wear resistance or enable operation of the head at higher temperatures. As noted above, the liner tube may also comprise a constriction at its exit.

A suitable multi-wire feed-head may have an external shape and internal configuration different from those described above and shown in FIGS. 1 and 3 to 6. Intersecting upward- and downward-facing surfaces $15_C$ and $15_D$ may be equal-sized and disposed symmetrically about a horizontal plane, upward-facing surfaces $15_B$ and $15_C$ and downward-facing surface $15_D$ need not be sections of conic surfaces, downward facing surface $15_{EC}$ or $15_{EF}$ need be flat or concave, and one or more of these surfaces may be combined to form a single surface bounding at least part of section $15_L$. Further, coupling section $15_U$ may be incorporated into section $15_M$, and sections $15_U$ and $15_M$ may be incorporated into section $15_L$, which may couple directly to heat source 14. The head 15 may be formed in a variety of external shapes that present an appropriate upward-facing surface (or surfaces), for the wire feed and powder feed entrances, coupling to the directional heat source, and an appropriate downward facing surface (or surfaces), for the exits of the wire and powder channels and the heat delivery channel.

The wire (or powder) channels and heat delivery channel may be disposed in a variety of configurations that allow delivery of the ends of one or more wires, and optionally one or more powder streams, into one or more common foci disposed at the center of heat path B (or an associated heat affected zone). In general, the heat directing channel need not traverse the head in a direction parallel to the longitudinal head axis and need not emerge at the center of an axially symmetric downward-facing surface, and the wire and powder channels need not be disposed symmetrically around the heat delivery channel, need not all have the same internal diameters and lengths, and, as already noted, need not all be directed towards a single common focus. However, a configuration with an axial heat delivery channel and symmetrical wire/powder channels converging on single common focus disposed along the head axis may be adopted to improve the thermal and mechanical stability of the head, leading to more accurate and precise control of, particular, the wire feeds, and, therefore, sample composition. Further, by delivering wires in a symmetrical arrangement into an inherently highly symmetrical heat-affected zone, which is typically the case for a melt pool formed on a horizontal surface by a localized heat source, more stable and controllable process conditions may be achieved, particularly when balancing the entry of material into a molten alloy portion against the rate of solidification, while also compensating for increased sample height, as discussed above.

Depending on the specific internal and external head configuration, particularly, the size and separation of the upward-facing and downward-facing surfaces across which the wire (and optionally powder/gas stream) channel entrances and exits are distributed, and the size of those channel exits and entrances, anywhere from two to about fifty (50) channels may be accommodated in a feed-head of the type shown in FIGS. 1 and 3 to 6. Such a feed-head, having twelve symmetrically disposed wire channels with entrances intersecting surface $15_C$ and exits forming a circle on flat lower surface $15_E$, was used to fabricate the binary alloy examples discussed below. One advantage of having 12 symmetrically distributed channels is that two, three, four, six or twelve wires may be distributed symmetrically around the feed-head, allowing symmetrical delivery of wire lower portions.

Wire feeders, as shown schematically in FIG. 1 by spools $S_1$ and $S_2$ and drive wheels $F_1$ and $F_2$, may be of a number of suitable designs. For example, a precision wire-feeder of the type described in U.S. Pat. No. 5,137,223 (US Dept. of Energy), comprising a torque motor coupled to the spool to apply tension to the wire, a stepper motor coupled to an elastic-coated drive wheel to deliver wire into a feeder tube and an idler deployed to reverse direction of the wire moving between spool and drive wheel, may be particularly suitable. As discussed above, the feed rates of each of multiplicity of wires may be regulated independently. For typical wire diameters, between 0.125 and 2 mm, wire feed rates may be regulated up to around 40 m/minute, with and accuracy of a few mm. A wire feed can typically be started or stopped within approximately 0.1 seconds.

Powder feeders may be one or several commercially available, generally gas-stream assisted, types, such as Sulzer Metco model Twin 10C fluidized bed powder feeder, capable of delivering powder at a rate between around 0.05 to 10 grams per minute. The powder stream may be pre-warmed before introduction into the channels to improve flow. Powder channels may also be lined with a tube of a suitable material having improved wear or thermal resistance over the material comprising the head. As already noted, when using powder/gas streams, the rate at which material is incorporated into a molten sample is less amenable to rapid control.

In order to minimize the exposure of molten or heated alloys and constituents to contaminants, and prevent uncontrolled reactions with the constituents of the atmosphere, the multi-wire feed-head may be operated in an inert gas atmosphere, in a vacuum-pumped chamber back-filled with inert gas or with a flowing inert gas shield, or at reduced pressure in a vacuum-pumped chamber. As already noted, when operating the system in a vacuum chamber, a regulated amount of one or more reactive gases, may be introduced into the chamber housing the multi-wire feed head, for controlled incorporation into an alloy sample, optionally directed towards the sample, including as part of the powder streams.

As already discussed, the multi-wire feed-head may be equipped with control mechanisms for applying relative motion (rotation and or displacement) between head and work-piece, which may be operated/programmed, in combination with wire feed (and optionally powder feeds) control mechanisms, to form combinatorial series or libraries of sufficiently separated alloy samples, typically distributed on the surface of a planar work-piece. On the other hand, as already noted, by applying well known additive-manufacturing control techniques, and by depositing successive layers of alloy material, a three-dimensional shaped component, optionally having a graded and diverse composition may be formed. (In either mode, depending on the type of directional heat source applied, continuous operation of the heat source may be advantageous for stability.)

EXAMPLES

Alloy samples, including the Fe/Al and Nb/Ti binary examples discussed below, were formed using a multi-wire feed-head comprising upper, middle and lower sections, with the lower head section bounded by two upward-facing sections of conical surfaces, a downward facing section of a conical surface and a flat lower surface, as described and shown in FIGS. 1 and 3. The axially feed head was made from a Cu alloy with, unlike the example shown in FIGS. 4A and 4B, 12 wire channels entrances distributed symmetrically at equal distances from the longitudinal head axis across the lower upward-facing section of conical surface (equivalent to surface $15_C$ in FIGS. 3 and 4A). The longitudinal axes of the 12 cylindrical channels, each comprising a uniform 1.6 mm diameter section approximately 40 mm in length, are each inclined at 40 degrees to the horizontal plane (50 degrees to longitudinal head axis), with the 12 elliptical channel exits distributed symmetrically on the flat lower head surface (equivalent to $15_{EF}$ in FIG. 3), and each exit having a 0.7 mm diameter constriction, with the 12 exits together describing a 12.5 mm diameter circle centered on the longitudinal axis of the head.

An axial heat delivery channel, approximately 5 mm in diameter at its exit at the center of the flat lower surface, allowed the adjustable output of a 1750 W $CO_2$ laser to be directed along the longitudinal axis of the head and onto the work-piece and the sample. Multi-wire feed-head and work-piece were operated in a chamber, evacuated and back-filled with Ar, and equipped with an optical system for observing alloy sample formation in real time.

Example 1—Fe/Al

A binary Fe/Al alloy was prepared using Fe and Al wire, 0.5 mm diameter of 99.95% purity Fe and 99.5% purity Al (Goodfellow, UK), melted with the $CO_2$ laser output set at 768 W, focused to a spot with a diameter of around 2 mm on a flat stainless steel (SS304) substrate disposed approximately 11 mm below and parallel to the flat lower surface of the head.

Fe wire was fed into the heat-affected region until a visible Fe melt pool nucleus had formed. Al wire was then fed into the melt pool nucleus and Fe and Al wires fed simultaneously until the melt pool reached approximately 6 mm in diameter, after an interval of approximately 30 seconds. Throughout nucleation and growth of the alloy melt pool, the Fe feed rate was set at a fixed 909 mm/min. During the alloy melt pool growth, the Al feed rate was fixed at 349 mm/min.

With Fe and Al feed rates and the laser operating conditions unchanged, the head was then displaced vertically relative to the substrate at a uniform rate of 9 mm/min over an interval of around 3 to 4 minutes, during which time the apparent diameter of the molten portion remained the same, while a solid Fe—Al alloy portion between the substrate and molten portion formed and increased in size. The Fe and Al wire feeds were then stopped and the laser source immediately removed from the sample.

Ignoring the small excess of Fe in the molten nucleus, assuming complete incorporation of the equal diameter Fe and Al wires into the molten portion, and no preferential losses or incorporation of other elements in the molten and solid portions, a fixed Fe feed rate of 909 mm/min and a fixed Al feed rate of 349 mm/min defines the average composition of the alloy sample to be 909 parts Fe and 349 parts Al, which, adjusted for the different atomic weights and densities of solid Fe and Al, is equivalent to Fe-21 at % Al.

A cross-section of the Al—Fe sample, observed in a scanning electron microscope ("SEM") at 20 kV operated in compositional contrast (back scatter) mode, showed a uniform and fine-grained microstructure, consistent with cast Fe-21 at % Al alloys prepared in bulk. Further, quantitative composition measurements performed in the SEM on different sample areas using energy dispersive x-ray spectroscopy analysis ("EDS") yielded an average sample composition of Fe-21.1 at % Al±0.5 at %, consistent with complete incorporation of the selected lengths of Al and Fe wire.

Example 2—Nb/Ti

A binary Nb/Ti alloy was prepared using Nb wire, 0.5 mm diameter of 99.9% purity (Plansee, Germany), and Ti wire of 99.6% purity (Goodfellow, UK), melted with the $CO_2$ laser output set at 1690 W, focused to a spot with a diameter of around 2 mm on a flat stainless steel (SS304) substrate disposed approximately 11 mm below and parallel to the flat lower head surface.

Nb wire was fed into the heat-affected region until a visible Nb melt pool nucleus had formed. Ti wire was then introduced into the melt pool and Nb and Ti wires fed simultaneously until the melt pool reached approximately 4 mm in diameter, after an interval of approximately 30 seconds. Throughout nucleation and growth of the alloy melt pool, the Nb feed rate was set at a fixed 208 mm/min. During growth, the Ti feed rate at a fixed set at 26 mm/min.

With Nb and Ti feed rates and the laser operating conditions unchanged, the head was displaced vertically relative to the sample at a uniform rate of 4 mm/min over an interval of around 3 to 4 minutes, during which time the apparent diameter of the melt pool remained the same, while a solid Nb—Ti alloy portion between the substrate and molten portion formed and increased in size. The Nb and Ti wire feeds were then stopped and the laser source immediately removed from the sample.

Ignoring the small amount of excess Nb in the sample nucleus, assuming complete incorporation of the equal diameter Nb and Ti wires into the molten portion, and no preferential losses or incorporation of other elements in the molten and solid portions, a fixed Nb feed rate of 208 mm/min and Ti feed rate of 26 mm/min defines the average composition of the alloy sample to be 208 parts Nb and 26 parts Ti, which, adjusted for the different atomic weights and densities of solid Nb and Ti, is equivalent to Nb-11.5 at % Ti A cross-section of the Nb—Ti sample, observed in a scanning electron microscope ("SEM") at 20 kV operated in compositional contrast (back scatter) mode, showed a uniform and fine-grained microstructure, consistent with cast Nb-11 at % Ti alloys prepared in bulk. Further, quantitative composition measurements performed in the SEM on different sample areas using energy dispersive x-ray spectroscopy analysis ("EDS") yielded an average sample composition of Nb-11.7 at % Ti±0.8%, consistent with complete incorporation of the selected lengths of Nb and Ti wire.

The invention claimed is:

1. A method for producing multiple alloy samples, comprising:
   furnishing a directional heat source and an integrated multi-wire feed-head, the integrated multi-wire feed-head having a first wire feed exit, a second wire feed exit, and a heat dispensing exit all disposed on a single downward-facing surface;
   disposing a work-piece surface a fixed distance from the downward-facing surface of the integrated multi-wire feed-head;
   wherein the integrated multi-wire feed-head and work-piece are configured to allow the feed-head to deliver, through the heat dispensing exit disposed in the downward-facing surface, heat from the directional heat source into a heat-affected region comprising at least a portion of the work-piece surface, wherein
   the feed-head is further configured to feed, from one or more of the first wire feed exit and a second wire feed exit, the ends of one or more of a multiplicity of wires having diverse compositions into the heat-affected region;
   the method further comprising:
   delivering heat and feeding selected lengths of at least two wires having diverse compositions into the heat-affected region to form, on the portion of the work-piece surface, at least a homogeneous molten alloy portion having a composition defined by the cross sectional areas and relative proportions of the selected lengths of the at least two wires; and
   cooling the homogeneous molten alloy portion to form a solid alloy portion having the same defined composition as the homogeneous molten alloy portion to form one of the multiple alloy samples.

2. The method of claim 1, wherein the selected lengths of the at least two wires are fed simultaneously into the heat affected region.

3. The method of claim 2, further comprising, following the delivering heat into the heat-affected region while feeding and melting selected lengths of the at least two wires:
   delivering heat and feeding second selected lengths of the at least two wires having diverse compositions into the homogeneous molten alloy portion over a second time interval while maintaining the defined composition of the homogeneous molten alloy portion essentially constant during the second time interval; and
   maintaining an essentially fixed distance between the feed-head and the molten alloy portion during the second interval by increasing the distance between the feed-head and the original work-piece surface to compensate for formation of a solid alloy portion disposed between the homogeneous molten alloy portion and the original work-piece surface.

4. The method of claim 1, further comprising the step of regulating the selected lengths by regulating the feed rates of the at least two wires over a time interval.

5. The method of claim 1, further comprising, immediately preceding the step of delivering heat and feeding selected lengths of the at least two wires:
   delivering heat and feeding a length of one of the at least two wires into the heat affected region to form a molten nucleus on the portion of the work-piece surface, wherein the length is a negligible fraction of the selected length of that wire.

6. The method of claim 5, wherein the second selected lengths have the same relative proportions as the selected lengths, the feed rates of the at least two wires are fixed over the second time interval and the relative proportions of the second selected lengths are regulated by regulating the relative proportions of the feed rates of the at least two wires.

7. The method of claim 1, wherein the directional heat source is a laser, an electron beam or a plasma arc.

8. The method of claim 1, further comprising: creating a shaped component by applying controlled relative motion between feed-head and work-piece while directing heat and feeding the at least two wires to form successive solid alloy layers on selected regions of the work-piece surface, wherein the selective layers comprise a shaped alloy component having a defined composition.

9. The method of claim 8, further comprising:
   changing the defined composition of at least a portion of the successive solid alloy layers, wherein the selected layers comprise a shaped alloy component comprising regions of diverse defined alloy compositions.

10. The method of claim 1, further comprising: creating a combinatorial alloy sample series or library by applying controlled relative motion between feed-head and work-piece and forming, at different locations on the original work-piece surface, a multiplicity of alloy samples have diverse defined compositions and/or diverse thermal histories.

* * * * *